United States Patent Office 3,162,671
Patented Dec. 22, 1964

3,162,671
HYDROCARBYLCHALCAHYDROXYOXAHEXYL
HYDROCARBONTHIOPHOSPHONATES
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,652
14 Claims. (Cl. 260—461)

This invention relates to novel reaction products of hydrocarbylchalcaepoxyalkanes and hydroxyalkyl hydrocarbonthiophosphonates. More particularly, this invention pertains to hydrocarbylchalcahydroxyoxahexyl hydrocarbonthiophosphonates, hereafter known for reasons of brevity as the hydroxyoxahexyl thiophosphonates.

In the nomenclature used hereinbefore and hereinafter the term "hydrocarbyl" denotes halogenated hydrocarbon derived radicals as well as hydrocarbon derived radicals. "Chalca" signifies sulfur or oxygen.

The hydroxyoxahexyl thiophosphonates of the invention are useful as thermal stability additives for fuels such as jet fuels.

The hydroxyoxahexyl thiophosphonates of this invention are represented by the formula:

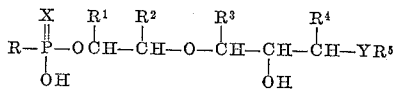

where R is a monovalent hydrocarbon derived radical, X is sulfur or a mixture of oxygen and sulfur, Y is sulfur or oxygen, $R^1$, $R^2$, $R^3$, and $R^4$ are either hydrogen or alkyl from 1 to 6 carbons and $R^5$ is a monovalent organic molecule of from 1 to 20 carbons selected from the group consisting of alkyl, alkenyl, aryl, alkaryl, aralkyl, and haloaryl.

Broadly, the thiophosphonates are formed by reacting hydroxyalkyl hydrocarbonthiophosphonate with a hydrocarbylchalcaepoxyalkane desirably in the presence of an acid as a catalyst.

PREPARATION OF THE HYDROXYALKYL HYDROCARBONTHIOPHOSPHONATE REACTANT

The hydroxyalkyl hydrocarbonthiophosphonate reactant is of the formula:

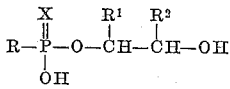

where R, $R^1$, $R^2$, and X are as heretofore defined. The thiophosphonate reactants contemplated herein are described in commonly assigned, copending application Serial No. 59,505, now Patent No. 3,087,956, filed September 30, 1960. Further, the preparation of the hydroxyalkyl hydrocarbonthiophosphonate is described in commonly assigned, copending application Serial No. 63,973, now Patent No. 3,123,630, filed October 21, 1960. As pointed out in these copending applications R in the formula immediately above can represent aromatic, cycloaliphatic and aliphatic hydrocarbon derived monovalent radicals. R is generally derived from a mono-olefinic polymer containing at least 12 carbon atoms although lower molecular weight olefins can be employed. Examples of mono-olefinic polymers contemplated herein are polyisobutylene, polybutylene, polypropylene and copolymers of mono-olefins such as propylene with isobutylene. R groups having an average molecular weight between 250 and 50,000 are advantageous. Other examples of suitable polyolefinic materials are copolymers of conjugated dienes with mono-olefins such as from butadiene with isobutylene having an average molecular weight in the above prescribed range.

As further pointed out in co-assigned, copending applications Serial Nos. 59,505, now Patent No. 3,087,956, and 63,973, now Patent No. 123,630, the thiophosphonate reactant is derived by first forming a $P_2S_5$-hydrocarbon reaction product by reacting $P_2S_5$ with the aforedescribed hydrocarbons, the $P_2S_5$ constituting 5 to 40% of the reaction mixture, at a temperature of about 100 to 320° C. in a non-oxidizing atmosphere, for example, under a blanket of nitrogen. The reaction product is then contacted with steam at a temperature between 100 and 260° C. Steam treatment hydrolyzes the hydrocarbon-$P_2S_5$ product to a hydrocarbon thiophosphonic acid and inorganic phosphorus acid. The hydrocarbon thiophosphonic acid has the general formula:

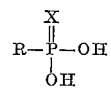

wherein R is the radical derived from the charged hydrocarbon, preferably an olefinic radical containing 20 to 200 carbon atoms, and X is sulfur or a mixture of oxygen and sulfur. X in the above formula is designated as sulfur or a mixture of sulfur and oxygen because the steam hydrolysis step usually results in replacement with oxygen of a portion of the sulfur joined to the phosphorus. The hydrocarbonthiophosphonic acid is reacted with an alkylene oxide of the formula:

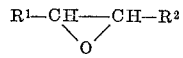

where $R^1$ and $R^2$ are hydrogen or alkyl radicals from 1 to 6 carbons, in the absence of catalyst, at a temperature of between about 60 and 150° C. to form the hydroxyalkyl hydrocarbonthiophosphonate reactant employed herein. This reaction is illustrated by the following equation:

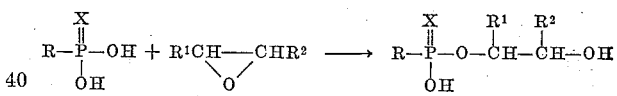

Examples of the hydroxyalkyl hydrocarbonthiophosphonate reactants contemplated herein are 2-hydroxyethyl polybutene (M.W. 780) thiophosphonate, 2-hydroxyethyl polybutene (M.W. 940) thiophosphonate, 2-hydroxyethyl propylenebutylene copolymer (M.W. 1100) thiophosphonate, 1-methyl-2-hydroxyethyl polyisobutylene (M.W. 2000) thiophosphonate, 1,2-diethyl-2-hydroxyethyl polypropylene (M.W. 2500) thiophosphonate.

HYDROCARBYLCHALCAEPOXYALKANE REACTANT

The hydrocarbylchalcaepoxyalkanes which react with hydroxyalkyl hydrocarbonthiophosphonates to form the novel hydroxyoxalkyl thiophosphonates of the invention are represented by the general formula:

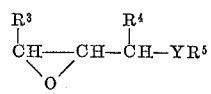

where $R^3$ and $R^4$ are hydrogen or an alkyl radical containing 1 to 6 carbon atoms, Y is oxygen or sulfur and $R^5$ is an organic monovalent radical having from 1 to 20 carbon atoms selected from the group consisting of alkyl, alkenyl, aryl, alkaryl, aralkyl, and haloaryl. Specific examples of the hydrocarbylchalcaepoxyalkanes contemplated herein are 3-methoxy-1,2-epoxypropane, 3-butoxy-1,2-epoxypropane, 3-phenylmercapto-1,2-epoxypropane, 3-(2′,4′-dichlorophenoxy)-1,2-epoxypropane, 3-alloxy-1,2-epoxypropane, 3-toloxy-1,2-epoxypropane, 3-benzoxy-1,2-epoxypropane, 3-phenoxy-1,2-epoxypropane and 3-methyl-3-butoxy-1,2-epoxypropane.

PREPARATION OF THE HYDROXYOXAHEXYL THIOPHOSPHONATES

Reaction of the hydrocarbylchalcaepoxyalkane with the hydroxyalkyl thiophosphonate in the presence of acid as catalyst to produce the novel thiophosphonates of the invention is affected at a temperature between about 25 and 175° C., preferably between about 75 and 125° C. and a mole ratio of epoxyalkane compound to thiophosphonate reactant to catalyst between about 0.5:1:0.001 and 5:1:0.1, desirably between about 1:1:0.005 and 2:1:0.01. Although atmospheric pressure is normally employed, superatmospheric and subatmospheric pressures may be utilized.

CATALYST

For the reaction between the hydroxyalkyl hydrocarbonthiophosphonate and hydrocarbylchalcaepoxyalkane to be significant, acid conditions should be present. These acid conditions can be supplied by the presence of Lewis acids (defined as molecules or ions capable of coordinating with unshared electron pairs), mineral or organic acids. Specific examples of these acid catalysts contemplated herein are boron trifluoride-etherate $$(BF_3 \cdot C_2H_5OC_2H_5)$$

$BF_3$, HF, $AlCl_3$, $SnCl_4$, $TiCl_4$, $H_2SO_4$, $H_3PO_4$, and $CCl_3CO_2H$.

The hydroxyoxahexyl thiophosphonates of the invention can be purified by standard means such as stripping the final reaction mixture under reduced pressure and elevated temperature (e.g., >90 C. and <10 mm. Hg) to remove the unreacted reactants therefrom leaving the hydroxyoxahexyl thiophosphonates of the invention. For those substances not removed by stripping and/or water washing, other appropriate means may be employed.

Examples of the hydroxyoxahexyl thiophosphonates of the invention are 5-hydroxy-6-butoxy-3-oxahexyl polybutene (M.W. 940) thiophosphonate; 5-hydroxy-6-alloxy-3-oxahexyl polybutene (M.W. 940) thiophosphonate; 5-hydroxy-7-methoxy-3-oxahexyl polybutene (M.W. 940) thiophosphonate; 5-hydroxy-6-phenoxy-3-oxahexyl polybutene (M.W. 940) thiophosphonate, 5-hydroxy-6-(2',4'-dichlorophenoxy)-3-oxahexyl polybutene (M.W. 940) thiophosphonate, and 5-hydroxy-6-phenylmercapto-3-oxahexyl polybutene (M.W. 940) thiophosphonate; 5-hydroxy-6-benzylmercapto-3-oxahexyl polyisobutylene (M.W. 2500) thiophosphonate; and 1,2,4,6-tetramethyl-5-hydroxy-6-toloxy-3-oxahexyl polypropylene (M.W. 1500) thiophosphonate.

The following examples further illustrate the invention and are not to be construed as limitations thereof. Example I illustrates the preparation of the hydroxyalkyl hydrocarbonthiophosphonate reactant ultilized in the remaining examples. Examples II—VII illustrate the preparation of the hydroxyoxahexyl thiophosphonates of the invention.

Example I

A polybutene-$P_2S_5$ reaction product was prepared by reacting polybutene having an average molecular weight of about 940 with $P_2S_5$ in a mole ratio of polybutene to $P_2S_5$ of 1.1:1 in the presence of sulfur in an amount equal to 0.5 wt. percent of the polybutene. The reaction was conducted at 232° C. until the reaction mixture was soluble in n-pentane. The polybutene-$P_2S_5$ reaction product was diluted with about 150 wt. percent of a naphthene base oil having an SUS viscosity at 100° F. of 100, steamed at 176° C. for 10 hours in a nitrogen atmosphere and then dried by passage of nitrogen therethrough at 176° C. The hydrolyzed (steamed) product was extracted with 50% by volume of methyl alcohol at 55° C. to give methanol extract containing inorganic phosphorus acid and a lubricating oil raffinite containing thiophosphonic acid of the formula:

$$\overset{X}{\underset{OH}{\underset{|}{R-\overset{\|}{P}-OH}}}$$

where R is a polybutene derived radical of an average molecular weight of about 940 which after stripping free of methanol had a Neut. No. of 22.6. The weight percent sulfur found in the raffinate was 0.51. The theoretical weight per cent sulfur for thiophosphonic acid of the formula:

$$\overset{S}{\underset{OH}{\underset{|}{R-\overset{\|}{P}-OH}}}$$

in the raffinate, where R is as heretofore defined, is 1.29 indicating X in the thiophosphonic acid product is a mixture of sulfur and oxygen.

The polybutene (M.W. 940) thiophosphonic acid of the type prepared above in an amount of 7440 grams (3.0 moles based on Neut. No.) was charged to a 12-liter, 3-necked flask equipped with a stirrer, a gas inlet tube extending below the surface of the acid reactant, a thermometer immersed in the acid, and a reflux condenser cooled with a Dry Ice-acetone mixture. The thiophosphonic acid was heated to 93° C. over an hour period with continuous stirring and nitrogen blowing at approximately 1 liter per minute. While the temperature in the flask was maintained at 93° C. and the nitrogen flow rate was reduced to 0.05 liter/minute and ethylene oxide was passed through a trap in which is was mixed with nitrogen and introduced into the reaction flask at a rate so as to maintain a gentle reflux. When ethylene oxide was no longer taken up as evidence by an increase in the reflux, its addition was stopped and the excess ethylene oxide in the reaction mixture allowed to reflux for 1 hour. At the end of this period, ethylene oxide remaining in the reaction flask was flushed therefrom by passing nitrogen through the reaction for a two hour period rate of 1 liter/minute. The excess ethylene oxide was recovered in a Dry Ice-acetone trap attached to the outlet of the reflux condenser. The product was then stripped at about 93° C. with 1 l./minute nitrogen sweep at atmospheric pressure. On cooling there was obtained a reaction product which was shown by analysis to consist primarily of 2-hydroxyethyl polybutenethiophosphonate of the formula:

$$\overset{X}{\underset{OH}{\underset{|}{R-\overset{\|}{P}-OCH_2-CH_2-OH}}}$$

wherein R is a polybutene derived radical of 940 average molecular weight and X is a mixture of sulfur and oxygen. This product analyzed as follows:

| Description | Calculated | Found |
|---|---|---|
| Neut. No | 0.0 | 2.8 |
| Hydroxyl No | 22 | 30 |
| Phosphorus, Wt. percent | 1.23 | 1.1 |
| Sulfur, Wt. percent | [1] 1.27 | 0.09 |

[1] Assuming X is 100% sulfur.

Example II 544 grams of an oil solution containing 0.2 mole of ethyl polybutene (M.W. 940) thiophosphonate prepared as in Example I were charged to a 1 liter, 3-neck flask equipped with a stirrer, thermometer, reflux condenser. To the thiophosphonate reactant there was added 2.8 grams (0.02 mole) boron trifluoride-etherate $$(BF_3 \cdot C_2H_5OC_2H_5)$$

The reaction mixture was heated to 93° C. with stirring and 26 grams (0.2 mole) of 3-butoxy-1,2-epoxypropane was added dropwise. After the butoxyepoxypropane addition, the stirring was continued for an additional period of two hours. At the end of the reaction period the reaction mixture was stripped of unreacted epoxide at a temperature of 93° C. under a mercury pressure of 1-2 mm. utilizing a nitrogen flow. On cooling the residual product was found to be 5-hydroxy-6-butoxy-3-oxahexyl polybutenethiophosphonate of the formula:

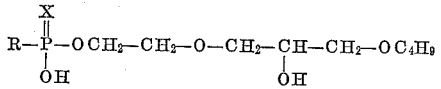

wherein R is a polybutene derived radical of a 940 average molecular weight and X is a mixture of sulfur and oxygen. The product analyzed as follows:

| Description | Calculated | Found |
|---|---|---|
| Phosphorus, Wt. percent | 1.09 | 0.98 |
| Hydroxyl No | 19.7 | 25 |
| Neut. No | 0 | 2.4 |
| Mole ratio, epoxide/thiophosphonate reactants in product | 1 | 0.85 |

Example III 544 grams of an oil solution containing 0.2 mole of 2-hydroxyethyl polybutene (940 M.W.) thiophosphonate prepared as in Example I were reacted with 28 grams (0.24 mole) of 3-alloxy-1,2-epoxypropane in the presence of 2.8 grams (0.02 mole) boron trifluoride-etherate by a procedure similar to that employed in Example II. As a result of this reaction there was obtained 5-hydroxy-6-alloxy-3-oxahexyl polybutene (940 M.W.) thiophosphonate of the formula:

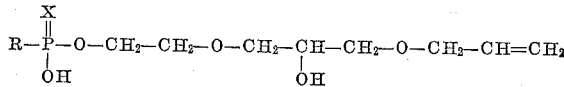

wherein R is derived from a polybutene of a 940 average molecular weight and X is a mixture of sulfur and oxygen. The product analyzed as follows:

| Description | Calculated | Found |
|---|---|---|
| Phosphorus, Wt. percent | 1.09 | 1.0 |
| Hydroxyl No | 19.8 | 28 |
| Neut. No | 0 | 1.8 |
| Mole ratio, oxide/thiophosphonate reactant in product | 1 | 1.02 |

Example IV 544 grams of an oil solution containing 0.2 mole of 2-hydroxyethyl polybutene (940 M.W.) thiophosphonate as prepared in Example I were reacted with 19.3 grams (0.22 mole) of 3-methoxy-1,2-epoxypropane in the presence of 2.8 grams (0.02 mole) boron trifluoride-etherate. The procedure was similar to that employed in Example II. As a result there was obtained 5-hydroxy-6-methoxy-3-oxahexyl polybutene thiophosphonate of the formula:

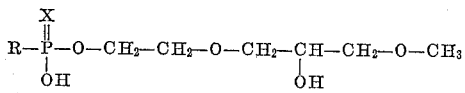

wherein R is a polybutene derived radical of an average molecular weight of 940 and X is a mixture of sulfur and oxygen. The product analyzed as follows:

| Description | Calculated | Found |
|---|---|---|
| Phosphorus, Wt. percent | 1.10 | 0.98 |
| Hydroxyl No | 19.6 | 25 |
| Neut. No | 0 | 1.4 |
| Mole ratio, epoxide/thiophosphonate reactant in product | 1 | 0.81 |

Example V 544 grams of an oil solution containing 0.2 mole of 2-hydroxyethyl polybutene (M.W. 940) thiophosphonate were reacted with 30 grams (0.2 mole) 3-phenoxy-1,2-epoxypropane in the presence of 2.8 grams (0.02 mole) of boron trifluoride etherate catalyst. The reaction procedure was similar to that found in Example II. As a result there was obtained 5-hydroxy-6-phenoxy-3-oxahexyl polybutenethiophosphonate of the formula:

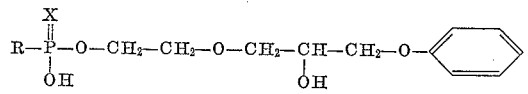

wherein R is a polybutene derived radical of an average molecular weight of 940 and X is a mixture of sulfur and oxygen. The product analyzed as follows:

| Description | Calculated | Found |
|---|---|---|
| Phosphorus, Wt. percent | 1.08 | 0.96 |
| Hydroxyl No | 19.8 | 25 |
| Neut. N | 0 | 2.8 |
| Mole ratio, epoxide/thio-phosphonate reactant in product | 1 | 0.90 |

Example VI 136 grams of an oil solution containing 0.05 mole of 2-hydroxyethyl polybutene (M.W. 940) thiophosphonate as prepared in Example I were reacted with 12 grams (0.055 mole) 3-(2',4'-dichlorophenoxy)-1,2-epoxypropane in the presence of 0.7 gram (0.055 mole) boron trifluoride-etherate by a procedure similar to that employed in Example II. As a result there was obtained 5-hydroxy-6-(2',4'-dichlorophenoxy)-3-oxahexyl polybutenethiophosphonate of the general formula:

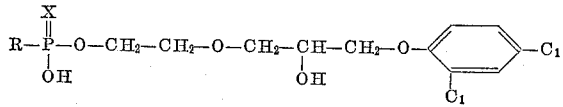

wherein R is a polybutene derived radical of an average molecular weight of 940 and X is a mixture of sulfur and oxygen. This reaction product analyzed as follows:

| Description | Calculated | Found |
|---|---|---|
| Phosphorus, Wt. percent | 1.05 | 1.07 |
| Chlorine, Wt. percent | 2.41 | 2.45 |
| Hydroxyl No | 19.1 | 25 |
| Neut. No | 0 | 2.0 |
| Mole ratio, epoxide/thio-phosphonate reactant in product | 1.0 | 1.0 |

Example VII 544 grams of an oil solution containing 0.2 mole of 2-hydroxyethyl polybutene (M.W. 940) thiophosphonate as prepared in Example I were reacted with 33 grams (0.2 mole) 3-phenylmercapto-1,2-epoxypropane under conditions similar to that found in Example II in the presence of 2.8 grams (0.02 mole) of boron trifluoride-etherate at 93° C. Further, the stripping temperature was 93° C. under 1-2 mm. Hg pressure. As a result there was obtained 5-hydroxy-6-phenylmercapto-3-oxahexyl polybutenethiophosphonate of the formula:

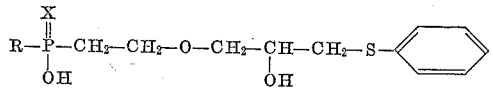

where R is a polybutene radical having an average

| Description | Calculated | Found |
| --- | --- | --- |
| Phosphorus, wt. percent | 1.07 | 0.97 |
| Sulfur, wt. percent | 1.62 | 1.40 |
| Hydroxyl No | 19.5 | 24 |
| Neut. No | 0 | 8.4 |
| Mole ratio, epoxide/thio-phosphonate reactant in product | 1 | 1 |

We claim:

1. Hydroxyoxahexyl thiophosphonate of the formula:

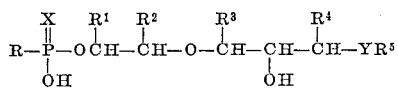

where R is a monovalent hydrocarbon derived from an aliphatic polyolefin having an average molecular weight between 250 and 50,000, $R^1$, $R^2$, $R^3$, and $R^4$ are selected from the group consisting of hydrogen and alkyl from 1 to 6 carbons, $R^5$ is amonovalent organic member of 1 to 20 carbons selected from the group consisting of alkyl, alkenyl, phenyl, haloaryl phenylalkyl and alkylphenyl, X is selected from the group consisting of sulfur and a mixture consisting of a major portion of sulfur and a minor portion of oxygen and Y is selected from the group consisting of sulfur and oxygen.

2. A thiophosphonate in accordance with claim 1 wherein R is a polybutene having an average molecular weight of about 940, $R^1$, $R^2$, $R^3$ and $R^4$ are hydrogen, $R^5$ is butyl, X is a mixture consisting of a major portion of sulfur and a minor portion of oxygen and Y is oxygen.

3. A thiophosphonate in accordance with claim 1 wherein R is a polybutene of an average molecular weight of about 940, $R^1$, $R^2$, $R^3$ and $R^4$ are hydrogen, $R^5$ is allyl, X is a mixture consisting of a major portion of sulfur and a minor portion of oxygen and Y is oxygen.

4. A thiophosphonate in accordance with claim 1 wherein R is a polybutene having an average molecular weight of about 940, $R^1$, $R^2$, $R^3$ and $R^4$ are hydrogen, $R^5$ is methyl, X is a mixture consisting of a major portion of sulfur and a minor portion of oxygen and Y is oxygen.

5. A thiophosphonate in accordance with claim 1 wherein R is a polybutene having a molecular weight of about 940, $R^1$, $R^2$, $R^3$ and $R^4$ are hydrogen, $R^5$ is phenyl, X is a mixture consisting of a major portion of sulfur and a minor portion of oxygen and Y is oxygen.

6. A thiophosphonate in accordance with claim 1 wherein R is a polybutene having an average molecular weight of about 940, $R^1$, $R^2$, $R^3$ and $R^4$ are hydrogen, $R^5$ is 2',4'-dichlorophenyl, X is a mixture consisting of a major portion of sulfur and a minor portion of oxygen and Y is oxygen.

7. A thiophosphonate in accordance with claim 1 wherein R is a polybutene having an average molecular weight of about 940, $R^1$, $R^2$, $R^3$ and $R^4$ are hydrogen, $R^5$ is phenyl, X is a mixture consisting of a major portion of sulfur and a minor portion of oxygen and Y is sulfur.

8. A method of preparing hydroxyoxahexyl thiophosphonate of the formula:

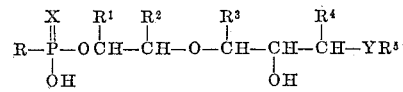

wherein R is a monovalent hydrocarbon derived from an aliphatic polyolefin having an average molecular weight between 250 and 50,000, $R^1$, $R^2$, $R^3$ and $R^4$ are selected from the group consisting of hydrogen and alkyl of from 1 to 6 carbons, $R^5$ is a member selected from the group consisting of alkyl, phenyl, alkylphenyl, phenylalkyl, allyl, alkenyl, and haloaryl of from 1 to 20 carbons, X is selected from the group consisting of sulfur and a mixture consisting of a major portion of sulfur and a minor portion of oxygen and Y is a chalcogen selected from the group consisting of sulfur and oxygen, comprising contacting hydroxyalkyl hydrocarbonthiophosphonate of the formula:

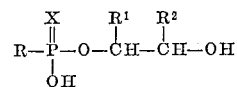

with a hydrocarbylchalcaepoxyalkane of the formula:

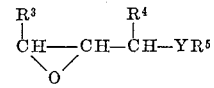

where R, $R^1$, $R^2$, $R^3$, $R^4$, $R^5$, X and Y are as heretofore defined in the presence of an acid catalyst selected from the group consisting of ($BF_3 \cdot C_2H_5OC_2H_5$), $BF_3$, HF, $AlCl_3$, $SnCl_4$, $TiCl_4$, $H_2SO_4$, $H_3PO_4$, and $CCl_3CO_2H$, and at a temperature between 25 and 175° C., the mole ratio of epoxyalkane compound to thiophosphonate reactant to catalyst being between about 0.5:1:0.001 and 5:1:0.1.

9. A method in accordance with claim 8 in which R is a polybutene having an average molecular weight of about 940, $R^1$, $R^2$, $R^3$ and $R^4$ are hydrogen, $R^5$ is butyl, X is a mixture consisting of a major portion of sulfur and a minor portion of oxygen, Y is oxygen, and said catalyst is boron trifluoride-etherate.

10. A method in accordance with claim 8 where R is a polybutene of an average molecular weight of about 940, $R^1$, $R^2$, $R^3$ and $R^4$ are hydrogen, $R^5$ is allyl, X is a mixture consisting of a major portion of sulfur and a minor portion of oxygen, Y is oxygen, and said catalyst is boron trifluoride-etherate.

11. A method in accordance with claim 8 wherein R is a polybutene having an average molecular weight of about 940, $R^1$, $R^2$, $R^3$ and $R^4$ are hydrogen, $R^5$ is methyl, X is a mixture consisting of a major portion of sulfur and a minor portion of oxygen, Y is oxygen, and said catalyst is boron trifluoride-etherate.

12. A method in accordance with claim 8 wherein R is a polybutene having a molecular weight of 940, $R^1$, $R^2$, $R^3$ and $R^4$ are hydrogen, $R^5$ is phenyl, X is a mixture consisting of a major portion of sulfur and a minor portion of oxygen, Y is oxygen, and said catalyst is boron trifluoride-etherate.

13. A method in accordance with claim 8 wherein R is a polybutene having an average molecular weight of about 940, $R^1$, $R^2$, $R^3$ and $R^4$ are hydrogen, $R^5$ is 2',4'-dichlorophenyl, X is a mixture consisting of a major portion of sulfur and a minor portion of oxygen, Y is oxygen, and said catalyst is boron trifluoride-etherate.

14. A method in accordance with claim 8 wherein R is a polybutene of an average molecular weight of about 9, $R^1$, $R^2$, $R^3$ and $R^4$ are hydrogen, $R^5$ is phenyl, X is a mixture consisting of a major portion of sulfur and a minor portion of oxygen, Y is sulfur, and said catalyst is boron trifluoride-etherate.

No references cited.